United States Patent
Correa (10) Patent No.: US 12,157,369 B2
(45) Date of Patent: Dec. 3, 2024

(54) TRANSMISSION-MOUNTED COMBINED ENERGY RECOVERY DRIVE

(71) Applicant: CUMMINS INC., Columbus, IN (US)

(72) Inventor: Dixon Malcolm Correa, Columbus, IN (US)

(73) Assignee: Cummins Inc., Columbus, IN (US)

(*) Notice: Subject to any disclaimer, the term of this patent is extended or adjusted under 35 U.S.C. 154(b) by 640 days.

(21) Appl. No.: 17/175,104

(22) Filed: Feb. 12, 2021

(65) Prior Publication Data

US 2021/0188074 A1 Jun. 24, 2021

Related U.S. Application Data

(63) Continuation of application No. PCT/US2019/049500, filed on Sep. 4, 2019.

(51) Int. Cl.
*B60K 6/387* (2007.10)
*B60K 6/48* (2007.10)
(Continued)

(52) U.S. Cl.
CPC ............. *B60K 6/387* (2013.01); *B60K 6/48* (2013.01); *B60K 6/547* (2013.01); *B60K 25/06* (2013.01);
(Continued)

(58) Field of Classification Search
CPC .. B60K 6/387; B60K 6/48; B60K 2006/4808; B60K 2006/4841; B60K 6/547;
(Continued)

(56) References Cited

U.S. PATENT DOCUMENTS 5,667,029 A * 9/1997 Urban ................ B60L 15/2054
180/65.23
2009/0018716 A1 1/2009 Ambrosio
(Continued)

FOREIGN PATENT DOCUMENTS

WO WO-2014/031099 A1 2/2014
WO WO-2018/102428 A1 6/2018

OTHER PUBLICATIONS

International Search Report and Written Opinion for PCT Application No. PCT/US2019/049500, dated Apr. 8, 2020.

*Primary Examiner* — Loren C Edwards
(74) *Attorney, Agent, or Firm* — Foley & Lardner LLP (57) ABSTRACT

An energy recovery drive system includes a motor-generator that is structured to selectively operate in a motor mode and a generator mode. A first shaft is operatively coupled to a transmission power take-off shaft. A second shaft is operatively coupled to the motor-generator and to an alternative power source. The energy recovery drive system is controllably operated in a plurality of operating modes. In a first operating mode, the motor-generator is in torque providing engagement with each of the first and second shafts. In a second operating mode, the motor-generator is in torque communicating engagement with each of the first and second shafts. In a third operating mode, which the motor-generator is in torque communicating engagement with the second shaft and is disengaged from transferring torque to the first shaft and from receiving torque from the first shaft.

20 Claims, 5 Drawing Sheets

(51) Int. Cl.
*B60K 6/547* (2007.10)
*B60K 25/06* (2006.01)
*B60L 7/10* (2006.01)
*B60L 50/15* (2019.01)
*B60W 20/11* (2016.01)

(52) U.S. Cl.
CPC ............... *B60L 7/10* (2013.01); *B60L 50/15* (2019.02); *B60W 20/11* (2016.01); *B60K 2006/4808* (2013.01); *B60L 2260/24* (2013.01)

(58) Field of Classification Search
CPC ........ B60K 2025/005; B60K 2025/022; B60K 25/06; B60W 20/11; B60L 50/15; B60L 50/16; B60L 7/10; B60L 2260/24; B60L 1/20; B60Y 2300/1886; Y02T 10/67; Y02T 10/7072; Y02T 10/92; Y02T 90/16
See application file for complete search history.

(56) References Cited

U.S. PATENT DOCUMENTS

| | | | | |
|---|---|---|---|---|
| 2011/0030370 A1* | 2/2011 | Kley | .................. | F02B 33/34 |
| | | | | 60/605.1 |
| 2015/0008057 A1* | 1/2015 | Lo | ..................... | B60L 50/15 |
| | | | | 180/65.23 |
| 2018/0099581 A1 | 4/2018 | Hughey | | |

* cited by examiner

TRANSMISSION-MOUNTED COMBINED ENERGY RECOVERY DRIVE

CROSS-REFERENCE TO RELATED PATENT APPLICATIONS

This application is a continuation of PCT Application No. PCT/US2019/049500, filed Sep. 4, 2019, which claims priority to and the benefit of U.S. Provisional Patent Application No. 62/728,425, filed Sep. 7, 2018, the contents of which are incorporated by reference in their entireties.

STATEMENT REGARDING FEDERALLY-SPONSORED RESEARCH OR DEVELOPMENT

This invention was made with government support under Department of Energy Contract No. DE-EE0007761 awarded by the Department of Energy. The government has certain rights in this invention.

TECHNICAL FIELD

The present disclosure relates generally to the field of energy recovery drive systems.

BACKGROUND

An energy recovery drive is a device designed to improve overall efficiency of a powertrain system by utilizing energy that would be otherwise lost. Some energy recovery drives utilize a motor-generator, which is a device that performs the functions of both a motor and an alternator (e.g., starting the engine and generating power for the electrical system). For example, the motor-generator can facilitate regenerative braking to recover energy that would otherwise be lost due to braking. During regenerative braking, the motor-generator operates as a generator to provide braking torque to the powertrain to convert the vehicle's kinetic energy to electrical energy, which can be stored in a battery for later use. The motor-generator can use the stored electrical energy to start the engine and to power (in part or in whole) the powertrain at an efficiency that is typically higher than that of an engine itself.

Waste heat recovery ("WHR") systems are another type of energy recovery drive system. WHR systems capture a portion of the waste heat generated by an engine to perform useful work. Some WHR systems utilize a Rankine cycle ("RC"). The RC is a thermodynamic process in which heat is transferred to a working fluid in an RC circuit. The working fluid is pumped to a boiler where it is vaporized. The vapor is passed through an expander and then through a condenser, where the vapor is condensed back to a fluid. The expanding working fluid vapor causes the expander to rotate, thereby converting the waste heat energy to mechanical energy. The mechanical energy may be transmitted to engine system components, such as a pump, a compressor, a generator, etc.

Hybrid electric vehicles ("HEVs") use both an engine and a motor-generator to drive the powertrain. HEVs can be classified into different categories based on their effected functions. In mild hybrid systems, the motor-generator assists the engine in driving the powertrain, but cannot fully drive the powertrain on its own. In full hybrid systems (also referred to as strong hybrid systems), the motor-generator can also drive the powertrain on its own without the engine.

HEVs can also be classified into different categories based on the configuration of the hybrid drive system. In parallel hybrid drive systems, the motor-generator and the engine contribute to driving the powertrain independently of one another. The powertrain can be driven by the engine, the motor-generator, or both. In parallel mild hybrid systems, the powertrain can be driven by the engine or by both the engine and the motor-generator; the powertrain cannot be driven by the motor-generator alone.

SUMMARY

Various embodiments relate to energy recovery drive systems. An example energy recovery drive system includes a motor-generator that is structured to selectively operate in a motor mode and a generator mode. The motor mode provides kinetic energy from electrical energy. The generator mode generates electrical energy from kinetic energy. A first shaft is operatively coupled to a transmission power take-off ("PTO") shaft. A second shaft is operatively coupled to the motor-generator and to an alternative power source. The energy recovery drive system is controllably operated in a plurality of operating modes. In a first operating mode, the motor-generator is in torque providing engagement with each of the first and second shafts. In a second operating mode, the motor-generator is in torque receiving engagement with each of the first and second shafts. In a third operating mode, which the motor-generator is in torque communicating engagement with the second shaft and is disengaged from transferring torque to the first shaft and from receiving torque from the first shaft.

Various other embodiments relate to powertrain systems for a parallel mild hybrid vehicles. An example powertrain system includes an engine and a transmission having a PTO shaft. A master clutch controllably and selectively couples the engine and the transmission. A combined energy recovery drive is operatively coupled to the PTO shaft of the transmission and to an alternative power source. The combined energy recovery drive is structured to generate energy from inertia of the parallel mild hybrid vehicle when the engine is decoupled from the transmission via the master clutch.

Still other embodiments relate to a method of recovering or providing energy in a parallel mild hybrid vehicle. A combined energy recovery drive is coupled to a transmission of an engine via a first shaft, the first shaft in rotational communication with a first gear train. The combined energy recovery drive is coupled to an alternative power source via a second shaft, the second shaft in rotational communication with a second gear train. The first shaft is selectively coupled to the second shaft via a master clutch, an engaged position of the master clutch comprising the master clutch in rotational communication with the first shaft and the second gear train, and a disengaged position of the master clutch comprising the master clutch not in rotational communication with the first shaft and the second gear train.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In various conventional parallel mild hybrid systems, the motor-generator is coupled directly to the engine. As such, it is not possible to decouple the engine and the motor-generator and still regenerate energy. For example, it is not possible to generate power via "engine-off coasting," in which the engine is shut off and decoupled from the transmission, and energy is generated from the inertia of the vehicle and/or from an alternative power source (e.g., a WHR turbine). Some full hybrid systems include a clutch between the motor and the engine to achieve this function. However, in engine-driven mild hybrid systems, space constraints and costs prohibit this arrangement.

Various embodiments relate to combined engine recovery drive systems. An example energy recovery drive system is mounted on a transmission of a mild hybrid system and is structured to recover energy from multiple sources, such as from the powertrain and from an alternative power source, such as a WHR system. In some embodiments, the energy recovery drive system includes a motor-generator that is operatively coupled to a PTO shaft of the transmission. This configuration allows the motor-generator to be disengaged from the engine via a master clutch of the transmission, thereby enabling the energy recovery drive system to regenerate power even when the engine is shut off, such as via vehicle inertia during engine-off coasting and via the alternative power source.

According to various embodiments, the combined energy recovery system is structured as a three-way system with interfaces to a motor-generator, an alternative power source (e.g., a WHR turbine), and a transmission PTO shaft. More specifically, the combined energy recovery system is structured to operate in various operating modes that allows power flow in any one of the following configurations: (1) from the transmission and the alternative power source to the motor-generator; (2) from the motor-generator and the alternative power source to the transmission; and (3) from the alternative power source to the motor-generator or from the motor-generator to the alternative power source, but not to the transmission.

According to various embodiments, the combined energy recovery drive system is structured as a standalone assembly that can be simply bolted to the back of a transmission with minimal modification required to the stock transmission design.

According to various embodiments, the combined energy recovery drive system is in transmission fluid communicating engagement with the transmission. In such embodiments, the combined energy recovery drive system utilizes transmission fluid for lubrication and cooling. This feature operates to minimize weight and complexity of the combined energy recovery drive system, and also improves operational efficiency of the combined energy recovery drive system.

Figure 1:
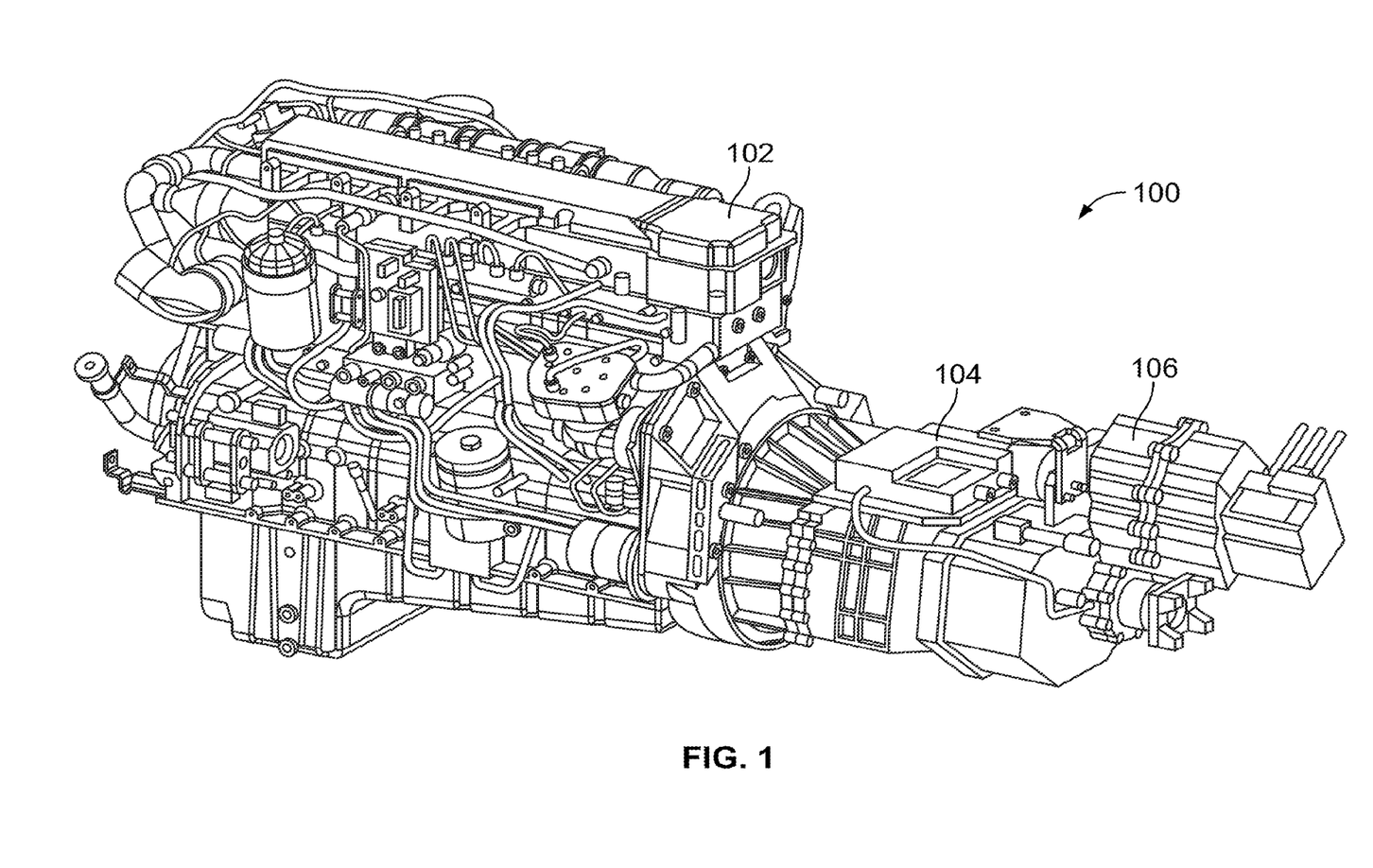
FIG. 1 is rear perspective view of a powertrain system, according to an example embodiment.

FIG. 1 is rear perspective view of a powertrain system 100, according to an example embodiment. In some embodiments, the powertrain system 100 is utilized in a mild hybrid electric vehicle. The powertrain system 100 includes an engine 102, a transmission 104, and an energy recovery drive system 106. The engine 102 is operatively coupled to the transmission 104 so as to transfer torque and power to the transmission 104. The transmission 104 includes one or more gear trains structured to controllably adjust speed and torque from the engine 102 to a driveshaft (not shown) to power a vehicle or stationary device (e.g., a genset). The energy recovery drive system 106 is operatively coupled to the transmission 104. The energy recovery drive system 106 is structured to regenerate energy recovered from the powertrain system 100 and/or from an alternative power source, and to transmit energy to the powertrain system 100.

Figure 2:
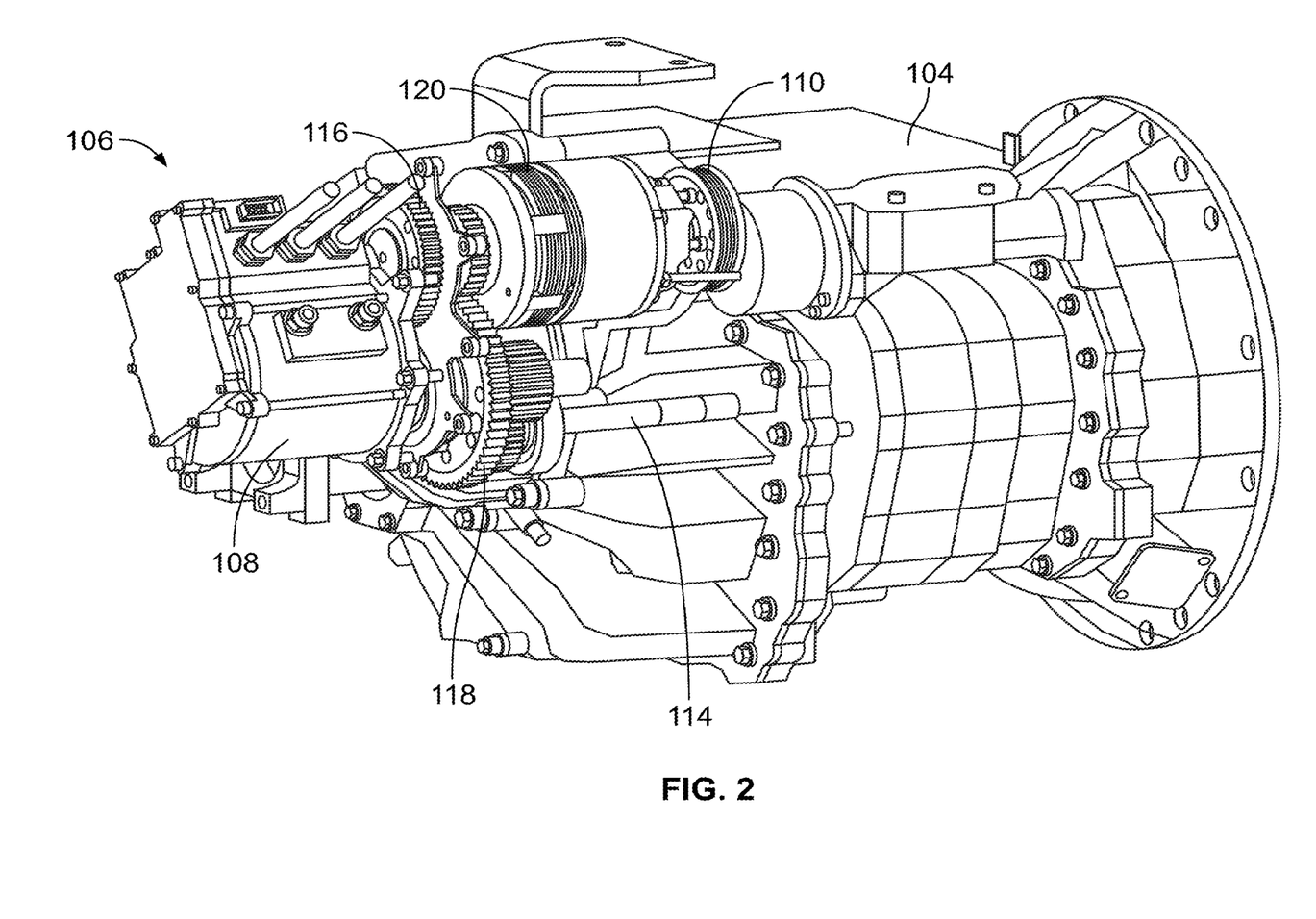
FIG. 2 is a front perspective view of a transmission and an energy recovery drive system of the powertrain system of FIG. 1, with the transmission grayed out to highlight the energy drive system.

FIG. 2 is a front perspective view of the transmission 104 and the energy recovery drive system 106 of the powertrain system 100 of FIG. 1, with the transmission 104 deemphasized to highlight the energy recovery drive system 106. The energy recovery drive system 106 includes a motor-generator 108, an alternative power source drive 110, a first shaft 114, a first gear train 116, a second gear train 118, and a clutch assembly 120.

The motor-generator 108 is operatively coupled to the transmission 104 via the first shaft 114. The motor-generator 108 is also operatively coupled to the alternative power source drive 110 via a second shaft (not shown). In some embodiments, the first shaft 114 is a PTO shaft of the transmission 104. The first gear train 116 is structured to adjust the speed and torque of energy transmitted between the motor-generator 108 and the second shaft. The second gear train 118 is structured to adjust the speed and torque of energy transmitted between the motor-generator 108 and the first shaft 114. The first and second gear trains 116, 118 are arranged as a parallel axis gear train. By structuring the first and second gear trains 116, 118 in this manner and optimizing the gear ratios of the first and second gear trains 116, 118, the energy recovery drive system 106 can be optimized such that each power source, including the transmission 104, the motor-generator 108, and the alternative power source coupled to the alternative power source drive 110, are operated at their individual peak efficiencies. In other embodiments, the first and second gear trains 116, 118 are arranged in other configurations, such as a planetary arrangement. The clutch assembly 120 is structured to selectively couple and decouple the alternative power source drive 110, the second shaft 130, and the motor-generator 108 from the first shaft 114 and the transmission 104.

Figure 3:
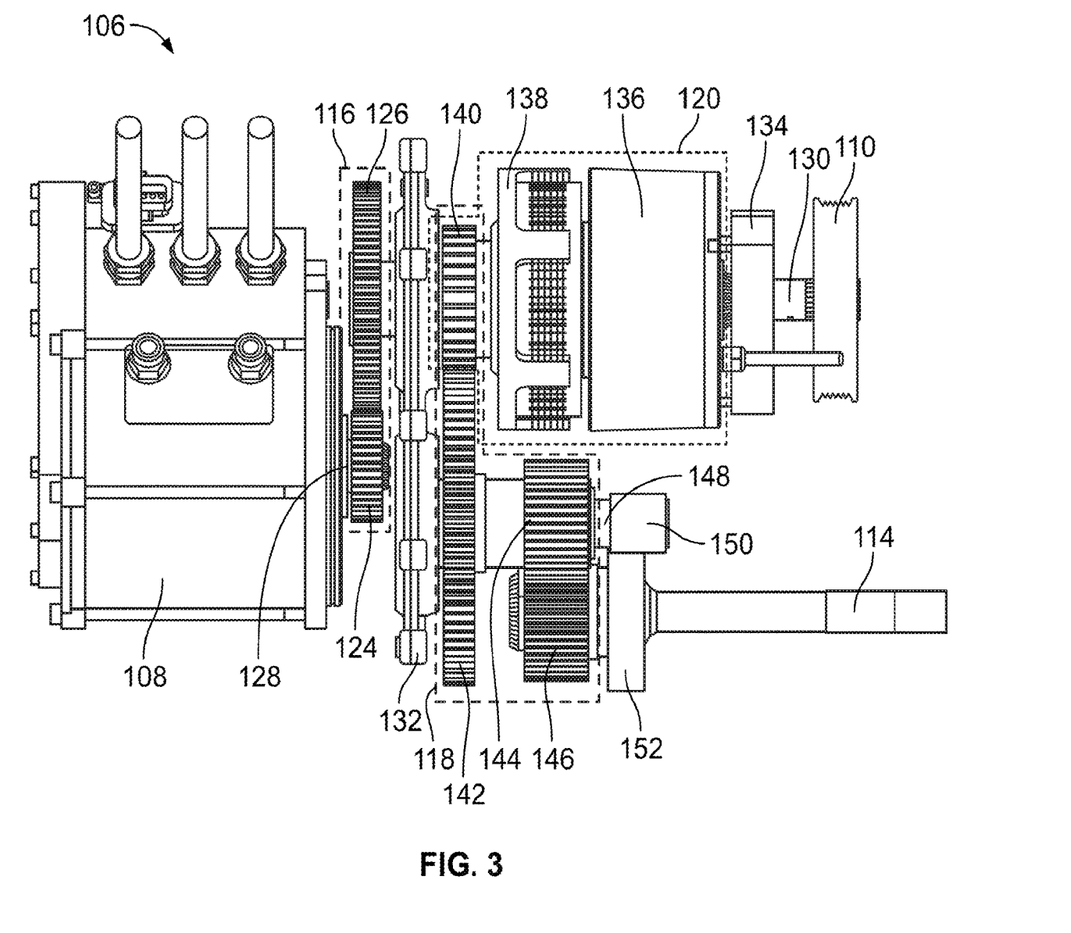
FIG. 3 is a side elevational view of the energy recovery drive system of FIG. 2.

FIG. 3 is a side elevational view of the energy recovery drive system 106 of FIG. 2. As shown in FIG. 3, first gear train 116 includes a first gear 124 and a second gear 126. The first gear 124 and the second gear 126 are in meshed engagement with each other. The motor-generator 108 includes a drive shaft 128 operatively coupled to the first gear 124. The second gear 126 is operatively coupled to a second shaft 130. The second shaft 130 is a unitary shaft that extends between the first gear 124 and the alternative power source drive 110. Various other components, including a first bearing (not shown) of a rear bearing housing 132, the clutch assembly 120, and a second bearing (not shown) of a front bearing housing 134 are also coupled to the second shaft 130, which extends therethrough.

The clutch assembly 120 includes a clutch housing 136, a clutch basket 138, and an integrated gear 140. The clutch housing 136 includes a clutch hub (not shown) fixedly coupled to (e.g., splined to) the second shaft 130 so as to co-rotate with the second shaft 130. The integrated gear 140 is fixedly coupled to the clutch basket 138. The integrated gear 140 is rotationally coupled to the second shaft 130 such that the integrated gear 140 is capable of rotating freely relative to the second shaft 130.

The clutch assembly 120 is controllable between an engaged position and a disengaged position. For example, in some embodiments, the clutch assembly 120 includes a plurality of friction plates, clutch springs that force the friction plates together, and an actuator. In some embodiments, the clutch assembly 120 is in a normally engaged position, absent external force applied thereto. In the engaged position, the clutch basket 138 is coupled to the clutch hub such that the clutch basket 138 and the integrated gear 140 co-rotate with the second shaft 130. In the engaged position, torque is transferred to and from the transmission 104 via the first shaft 114. In order to reach the disengaged position, the actuator forces the friction plates away from each other such that the clutch basket 138 is decoupled from the clutch hub so that the second shaft 130 rotates independently of the clutch basket 138 and the integrated gear 140. In the disengaged position, no torque is transferred to or from and from the transmission 104 via the first shaft 114. In some embodiments, the clutch assembly 120 includes a clutch position sensor (e.g., an inductive position sensor) to determine a current physical position of the clutch assembly 120.

The clutch assembly 120 is positioned on the second shaft 130 between the first gear train 116 and the second gear train 118. This location minimizes the torque provided to the clutch assembly 120, which allows the clutch to have a compact package size. Typically, the operating speed at which a motor-generator or an alternative power source operates at peak efficiency is higher than the operating speed of the engine, the transmission, or the PTO shaft. As a result, gear trains in energy recovery drive systems are typically designed to step up the speed going from the transmission to the motor-generator and the alternate power source. This results in a progressive reduction in torque after each gear set. According to various embodiments, by positioning the clutch assembly 120 between the first gear train 116 and the second gear train 118, and not right at the first shaft 114 (the PTO shaft), the clutch assembly 120 is exposed to lower torque and can be packaged in a smaller size compared to clutch assemblies in other arrangements.

The second gear train 118 includes the integrated gear 140 of the clutch assembly 120, a third gear 142, a fourth gear 144, and a fifth gear 146. The integrated gear 140 and the third gear 142 are in meshed engagement with each other. The fourth gear 144 and the fifth gear 146 are in meshed engagement with each other. The third gear 142 and the fourth gear 144 are operatively (e.g., fixedly) coupled to an idler shaft 148 so as to co-rotate with the idler shaft 148. The idler shaft supported by a third bearing (not shown) of the rear bearing housing 132 and a fourth bearing of an idler bearing housing 150.

The fifth gear 146 is operatively (e.g., fixedly) coupled to the first shaft 114 so as to co-rotate with the first shaft 114. The first shaft 114 is supported by a fourth bearing (not shown) of a first shaft bearing housing 152.

Figure 4:
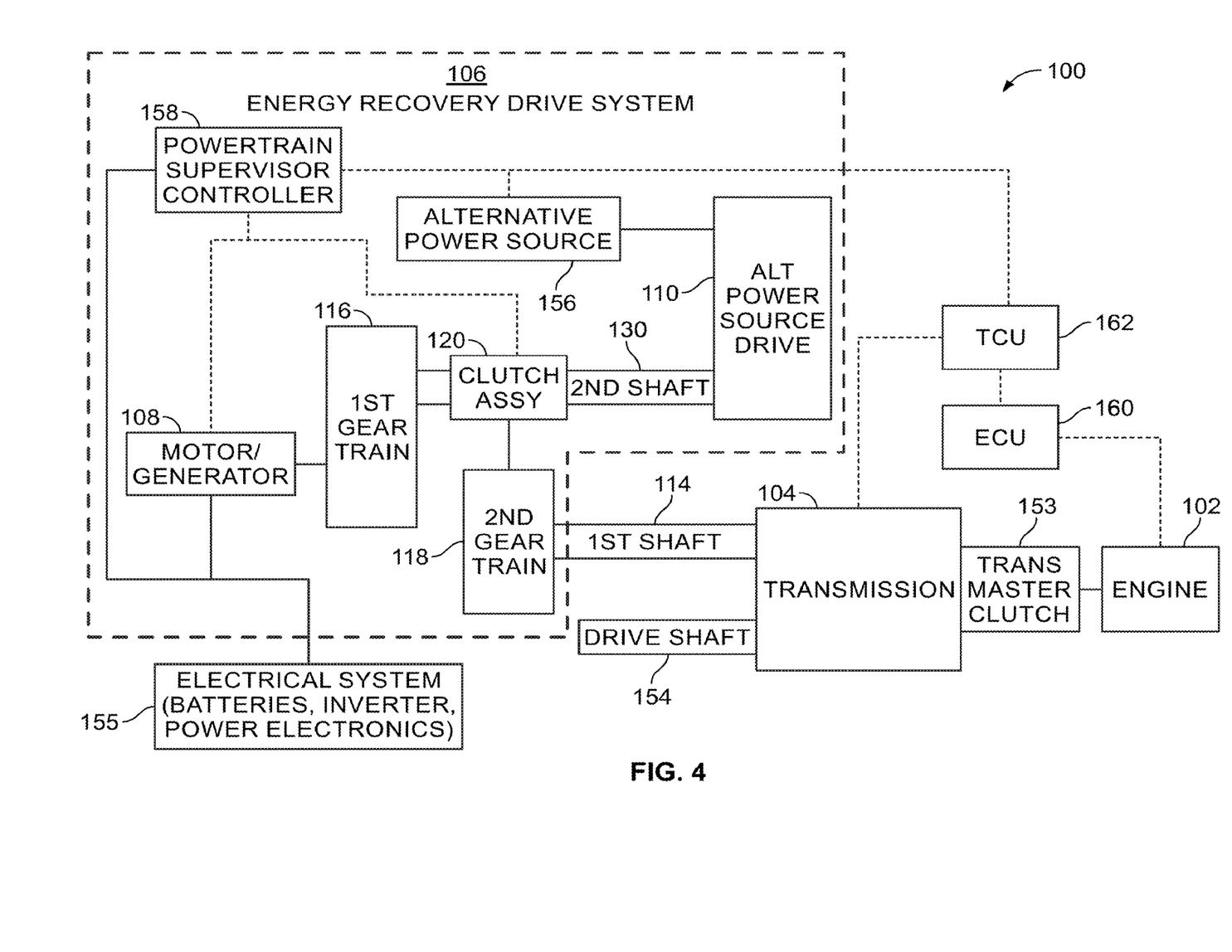
FIG. 4 is a block diagram of the powertrain system of FIG. 1 including the energy recovery drive system of FIGS. 2 and 3.

FIG. 4 is a block diagram of the powertrain system 100 of FIG. 1 including the energy recovery drive system 106 of FIGS. 2 and 3. As shown in FIG. 4, the powertrain system 100 includes the engine 102, the transmission 104, and the energy recovery drive system 106. The engine 102 is operatively coupled to the transmission 104 via a transmission master clutch 153. The transmission 104 includes the first shaft 114 and a drive shaft 154. The drive shaft 154 may power a final drive of a vehicle. As described above, the first shaft 114 is operatively coupled to the energy recovery drive system 106.

The powertrain system 100 also includes an electrical system 155 operatively coupled to the energy recovery drive system 106. More specifically, the electrical system 155 is operatively coupled to the motor-generator 108 and the powertrain supervisor controller 158. According to various embodiments, the electrical system 155 includes batteries, an inverter, and power electronics to transmit electrical energy to and to receive electrical energy from the motor-generator 108. It should be understood that the electrical system 155 may also be operatively coupled to other components of the powertrain system 100 and of a vehicle including the powertrain system 100.

In addition to the components described in connection with FIGS. 2 and 3, the energy recovery drive system 106 also includes an alternative power source 156 and a powertrain supervisor controller 158. The alternative power source 156 is operatively coupled to the alternative power source drive 110. The alternative power source drive 110 operatively couples the alternative power source 156 to the motor-generator 108. In some embodiments, the alternative power source 156 is a WHR turbine of a WHR system. However, the alternative power source 156 can be any type of power source. In some embodiments, the alternative power source drive 110 is a belt drive with pulleys coupled to the alternative power source 156 and to the second shaft 130. In some embodiments, the alternative power source drive 110 may also be used as a PTO.

The powertrain supervisor controller 158 is structured to control various aspects of the energy recovery drive system 106. The powertrain supervisor controller 158 is operatively and communicatively coupled to various components of the energy recovery drive system 106, such as the motor-generator 108, the clutch assembly 120, the alternative power source 156, the electrical system 155, and various sensors and other components. Various aspects of control functionality of the powertrain supervisor controller 158 are discussed further below.

The powertrain supervisor controller 158 is also operatively and communicatively coupled to an engine control unit ("ECU") 160 and a transmission control unit ("TCU") 162. The ECU 160 receives and analyzes input values from various sensors and controls various actuators and other devices to ensure optimal performance of the engine 102. The TCU 162 similarly receives and analyzes input values from various sensors and controls various actuators and other devices to ensure optimal performance of the transmission 104.

In some embodiments, the powertrain supervisor controller 158 is configured to monitor operation of the electrical system 155 and to control operation of the energy recovery drive system 106 based on operating conditions of the electrical system 155. For example, in some embodiments, the powertrain supervisor controller 158 is configured to monitor state of charge of an electrical storage unit (e.g., a battery) of the electrical system 155 and to control operation of the energy recovery drive system 106 based on the monitored state of charge. In some embodiments, the powertrain supervisor controller 158 is configured to control a position of the clutch assembly 120 and/or the transmission master clutch 153 based on the monitored state of charge. For example, in some embodiments, the powertrain supervisor controller 158 is configured to switch from the first operating mode in which the motor-generator 108 is operating as a generator to the second operating mode in which the motor-generator 108 is operating as a motor in response to the state of charge exceeding a threshold value.

Figure 5A:
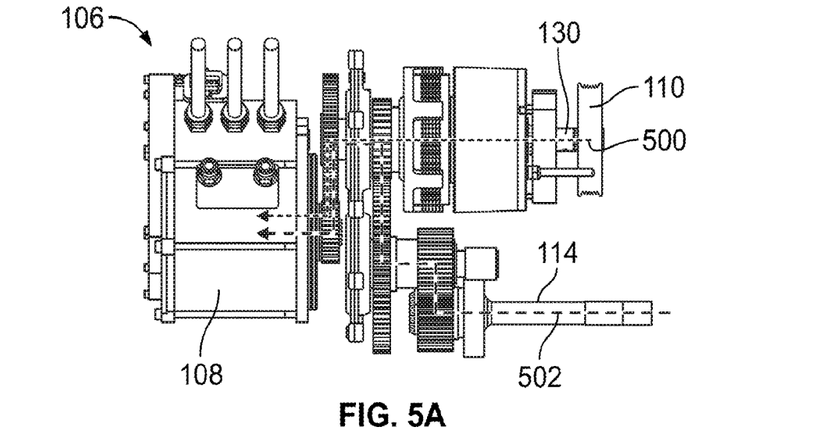
FIGS. 5A-5C illustrate various operating modes of the energy recovery drive system of FIGS. 2-4, according to various example embodiments.
Figure 5B:
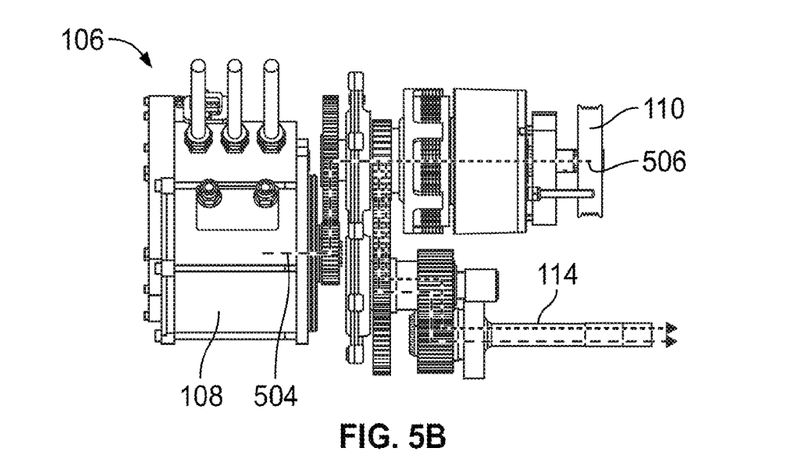
Figure 5C:
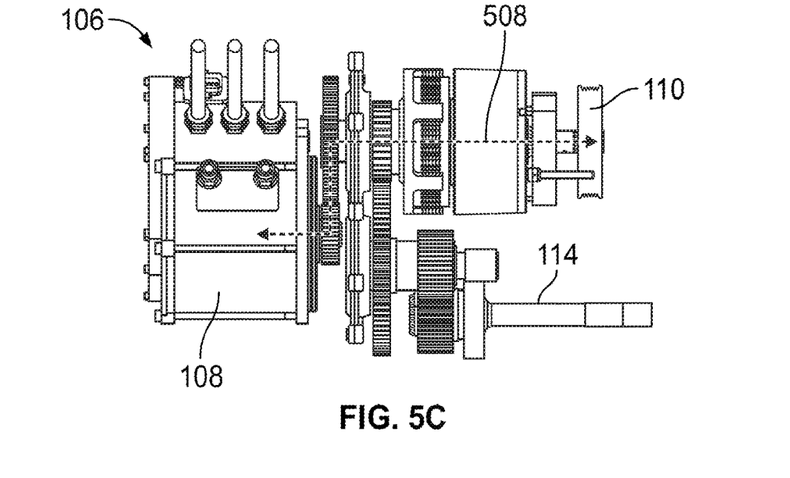

FIGS. 5A-5C illustrate various operating modes of the energy recovery drive system 106 of FIGS. 2-4, according to various example embodiments. The powertrain supervisor controller 158 is structured to control the energy recovery drive system 106 in the various operating modes based on conditions of the powertrain system 100. FIG. 5A illustrates a first operating mode of the energy recovery drive system 106. In the first operating mode, the motor-generator 108 is in torque receiving engagement with each of the first shaft 114 and the second shaft 130. In other words, in the first operating mode, the motor-generator 108 receives energy along a first path 500 from the alternative power source drive 110 via the second shaft 130 and receives energy along a second path 502 from the engine 102 or the transmission 104 via the first shaft 114. In the first operating mode, the motor-generator 108 operates as a generator to generate electrical energy from the received rotational energy. The clutch assembly 120 is in an engaged position.

FIG. 5B illustrates a second operating mode of the energy recovery drive system 106. In the second operating mode, the motor-generator 108 is in torque providing engagement with the first shaft 114 and the alternative power source drive 110 is also in torque providing engagement with the first shaft 114. In other words, in the second operating mode, the motor-generator 108 provides energy along a third path 504 to the transmission 104 via the first shaft 114. The alternative power source drive 110 also provides energy along a fourth path 506 to the transmission 104 via the second shaft 130. In the second operating mode, the motor-generator 108 operates as a motor to provide energy to the transmission 104. The clutch assembly 120 is in an engaged position.

FIG. 5C illustrates a third operating mode of the energy recovery drive system 106. In the third operating mode, the motor-generator 108 is in torque communicating engagement with the first shaft 114. In other words, in the third operating mode, the motor-generator 108 receives energy along a fifth path 508 from the alternative power source drive 110 via the second shaft 130. In the third operating mode, the clutch assembly 120 is disengaged so as to decouple the motor-generator 108 and the alternate power source drive 110 from the first shaft 114 and the transmission 104. Therefore, the motor-generator 108 is able to generate energy in the third operating mode from torque received from the alternative power source drive 110 without requiring operation of the engine 102 or the transmission 104. In addition, in the third operating mode, the motor-generator 108 is also able to provide torque to the second shaft 130 without requiring operation of the engine 102. For example, the torque provided by the motor-generator 108 to the second shaft 130 may be used to power one or more accessories coupled to the second shaft 130 without requiring operation of the engine 102. Therefore, the motor-generator 108 is also able to provide energy in the third operating mode to components coupled to the second shaft 130 without requiring operation of the engine 102 or the transmission 104. As used herein, the phrase "torque communicating engagement" includes both torque providing engagement and torque receiving engagement.

Further to the above, in some configurations, the alternative power source 156 (e.g., a waste heat recovery turbine) also powers pumps that are coupled thereto. During start-up, there is typically not enough thermal energy for the alternative power source 156 to achieve a sufficient power output (e.g., a high enough turbine power) to power these pumps. Therefore, in some configurations, the energy recovery drive system 106 utilizes the motor-generator 108 or engine 102 (which is disconnected in third operating mode) to power the alternative power source 156 via the alternative power source drive 110. In short, the motor-generator 108 does not only receive torque from alternative power source drive 110 but also provides torque to the alternative power source drive 110 in some scenarios. Additionally, the alternative power source drive 110 may be used to drive accessories other than the alternate power source 156.

Reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "in one embodiment," "in an embodiment," "in an example embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An energy recovery drive system comprising:
   a motor-generator structured to selectively operate in a motor mode and a generator mode, the motor mode providing kinetic energy from electrical energy, and the generator mode generating electrical energy from kinetic energy;
   a first shaft operatively coupled to a transmission power take-off shaft; and
   a second shaft operatively coupled to the motor-generator and to a waste heat recovery turbine;
   an alternative power source drive coupled to the second shaft and the waste heat recovery turbine operatively, the alternative power source drive coupling the motor-generator to the waste heat recovery turbine;
   a first gear train operatively coupled to the motor-generator and to the second shaft;
   a second gear train operatively coupled to the first shaft and to the second shaft;
   a clutch assembly positioned on the second shaft between the first gear train and the second gear train, the clutch assembly configured to selectively couple and decouple the alternative power source drive, the second shaft, and the motor-generator from the first shaft, wherein the energy recovery drive system is controllably operated in a plurality of operating modes, comprising:
a first operating mode in which the motor-generator is in torque providing engagement with each of the first shaft and the second shaft,
a second operating mode in which the motor-generator is in torque receiving engagement with each of the first shaft and the second shaft, and
a third operating mode in which the motor-generator is in torque communicating engagement with the second shaft and is disengaged from transferring torque to the first shaft and from receiving torque from the first shaft.

2. The system of claim 1, wherein the first gear train and the second gear train are structured to permit each of an engine, a transmission, the motor-generator, and the waste heat recovery turbine to operate independently at their respective peak efficiencies while minimizing a number of gear meshes to optimize gear train efficiency.

3. The system of claim 1, wherein,
the clutch assembly is controllable between an engaged position and a disengaged position to selectively enable and disable torque to be transmitted between (1) the motor-generator and the waste heat recovery turbine and (2) at least one of a transmission and an engine.

4. The system of claim 3, wherein the clutch assembly is positioned downstream of the second gear train so as to minimize torque exposed to the clutch assembly.

5. The system of claim 1, wherein the energy recovery drive system is constructed as a modular unit such that the energy recovery drive system can be mounted to a stock transmission with minimal modifications.

6. The system of claim 1, wherein the energy recovery drive system is configured to utilize transmission fluid for lubricating and cooling so as to minimize complexity and weight and improve system efficiency.

7. The system of claim 1, wherein the alternative power source drive is configured to provide torque to the motor-generator and receive torque to drive engine accessories other than the waste heat recovery turbine.

8. A powertrain system for a parallel mild hybrid vehicle, the system comprising:
an engine;
a transmission comprising a power take-off shaft;
a master clutch controllably and selectively coupling the engine and the transmission; and
a combined energy recovery drive operatively coupled to the power take-off shaft of the transmission and to a waste heat recovery turbine;
a first shaft operatively coupled to the power take-off shaft;
a second shaft operatively coupled to a motor-generator and to the waste heat recovery turbine;
an alternative power source drive coupled to the second shaft and the waste heat recovery turbine operatively, the alternative power source drive coupling the motor-generator to the waste heat recovery turbine;
a first gear train operatively coupled to the motor-generator and to the second shaft;
a second gear train operatively coupled to the first shaft and to the second shaft;
a clutch assembly positioned on the second shaft between the first gear train and the second gear train, the clutch assembly configured to selectively couple and decouple the alternative power source drive, the second shaft, and the motor-generator from the first shaft,
wherein the combined energy recovery drive is structured to generate energy from inertia of the parallel mild hybrid vehicle when the engine is decoupled from the transmission via the master clutch.

9. The system of claim 8, wherein:
the first gear train is in rotational communication with the first shaft, and
the second gear train is in rotational communication with the second shaft, and wherein the system further comprises:
an integrated gear coupled to the master clutch, the integrated gear in rotational communication with the second shaft when the master clutch is engaged with the second shaft.

10. The system of claim 9, wherein decoupling the engine from the transmission comprises disengaging the master clutch from the second shaft.

11. The system of claim 10, wherein disengaging the master clutch from the second shaft removes the rotational communication between the integrated gear and the second shaft.

12. The system of claim 8, wherein the combined energy recovery drive is further structured to generate energy from the waste heat recovery turbine when the engine is decoupled from the transmission via the master clutch.

13. The system of claim 8, wherein the combined energy recovery drive is further structured to provide torque to the second shaft when the engine is decoupled from the transmission via the master clutch.

14. A method of recovering or providing energy in a parallel mild hybrid vehicle, the method comprising:
coupling a combined energy recovery drive to a transmission of an engine via a first shaft, the first shaft in rotational communication with a first gear train;
coupling the combined energy recovery drive to a waste heat recovery turbine via a second shaft, the second shaft in rotational communication with a second gear train;
selectively coupling the first shaft and the second shaft via a master clutch, an engaged position of the master clutch comprising the master clutch in rotational communication with the first shaft and the second gear train, and a disengaged position of the master clutch comprising the master clutch not in rotational communication with the first shaft and the second gear train; and
selectively coupling, by a clutch assembly, the second shaft to a motor-generator to provide torque from the waste heat recovery turbine via an alternative power source drive to the motor generator, the clutch assembly being positioned on the second shaft between the first gear train and the second gear train.

15. The method of claim 14, further comprising:
setting the master clutch in the engaged position so as to transfer rotational motion of the transmission from the second gear train to the first shaft via the master clutch, wherein the combined energy recovery drive receives energy from the transmission via the first shaft.

16. The method of claim 14, further comprising:
setting the master clutch in the engaged position so as to transfer rotational motion of the waste heat recovery turbine from the first shaft to the combined energy recovery drive.

17. The method of claim 14, further comprising:
setting the master clutch in the engaged position so as to transfer torque from the combined energy recovery drive to the waste heat recovery turbine via rotation of the first shaft.

18. The method of claim 14, further comprising:
setting the master clutch in the engaged position so as to transfer torque from the energy recovery drive to the transmission via rotation of the first shaft.

19. The method of claim 18, wherein rotation of the first shaft induces rotation of the first gear train, rotation of the first gear train induces rotation of the second gear train, and rotation of the second gear train induces rotation of the second shaft, the rotation of the second shaft transferring torque from the energy recovery drive to the transmission.

20. The method of claim 14, further comprising:
setting the master clutch in the disengaged position so as to transfer rotational motion of the waste heat recovery turbine from the first shaft to the energy recovery drive while the engine is not operating.

* * * * *